United States Patent
Jense

[11] 3,805,341
[45] Apr. 23, 1974

[54] DEVICE FOR THE MANUFACTURE OF NON-WOVEN TEXTILE-LIKE AND TEXTILE-REINFORCED MATERIALS

[75] Inventor: Willem Frederik Jense, Enschede, Netherlands

[73] Assignee: Koninklijke Nederlandse Textiel-Unie N.V., Hengelo (Av.), Netherlands

[22] Filed: June 30, 1971

[21] Appl. No.: 158,390

[30] Foreign Application Priority Data
July 6, 1970 Netherlands.................. 7009948

[52] U.S. Cl................................ 28/1 CL, 156/439
[51] Int. Cl............................. D04h 3/04, D04h 3/14
[58] Field of Search .......... 28/1 CL; 156/439, 440; 26/58, 59

[56] References Cited
UNITED STATES PATENTS

| | | | |
|---|---|---|---|
| R13,974 | 8/1915 | Stevens | 156/439 |
| 1,014,916 | 1/1912 | Stevens | 156/439 |
| 1,238,742 | 9/1917 | Butler | 26/58 |
| 2,483,339 | 9/1949 | Gardner et al. | 26/59 UX |
| 2,702,406 | 2/1955 | Reed | 26/58 X |
| 3,519,509 | 7/1970 | Gidge et al. | 156/440 X |
| 3,639,954 | 2/1972 | Kirzinger et al. | 28/1 CL |

FOREIGN PATENTS OR APPLICATIONS

| | | | |
|---|---|---|---|
| 440,191 | 12/1935 | Great Britain | 156/439 |
| 481,245 | 12/1969 | Switzerland | 28/1 CL |

Primary Examiner—Robert R. Mackey
Attorney, Agent, or Firm—Hammond & Littell

[57] ABSTRACT

A device for the continuous supply of transverse threads to one or more continuous layers of longitudinal threads, foil, sheet and the like by means of two wheels at an angle, one wheel carrying means for the supply of threads at its periphery, the other wheel co-operating with a clamping belt over about half its periphery from the location of the shortest to the location of the longest distance between the peripheries of the two wheels.

3 Claims, 5 Drawing Figures

3,805,341

DEVICE FOR THE MANUFACTURE OF NON-WOVEN TEXTILE-LIKE AND TEXTILE-REINFORCED MATERIALS

The invention relates to a device for the manufacture of non-woven textile-like materials that are applied for the reinforcement of fleecy materials, film, foil, paper and the like. The methods applied in practice in general can be divided into systems in which the reinforcement is applied either diagonally or perpendicularly and parallel with respect to the direction of production.

The present invention relates to the latter system which offers the great advantage over the diagonal system that the tensile strength is improved.

The greatest drawback of known systems with perpendicular and parallel yarns is the very much restricted production speeds that can be attained that offer hardly any advantages over the weaving loom. The restrictions of these systems are mostly implied in the reciprocating parts of clamping devices and the like and the vibration-sensitivity and flexibility of conveyor chains and the like.

It is the object of the present invention to provide a device that can operate at a production speed that is 50 to 100 times the speed of a weaving loom.

To this end the device according to the invention comprises two synchronously rotatable wheels, the intersecting axes of which are situated in a plane that is parallel to the axes of said rollers, the first of said wheels being provided with peripherally distributed means for the supply of threads, the second of said wheels having a peripheral circular groove, and an endless belt running in said groove over a part of the periphery of said second wheel, the cross-section of said belt being in accordance with the profile of said groove to perform a clamping action on threads that lie across said groove.

In a device of such conception only rotating parts are used and the speed at which the second wheel pulls the threads from the first wheel gradually increases at the beginning and decreases at the end. As a result the device according to the invention easily realizes the high production speeds aimed at.

The invention will be further elucidated with reference to the accompanying diagrammatic drawing, in which FIG. 1 is a top view of a device according to the invention;

Figure 1:
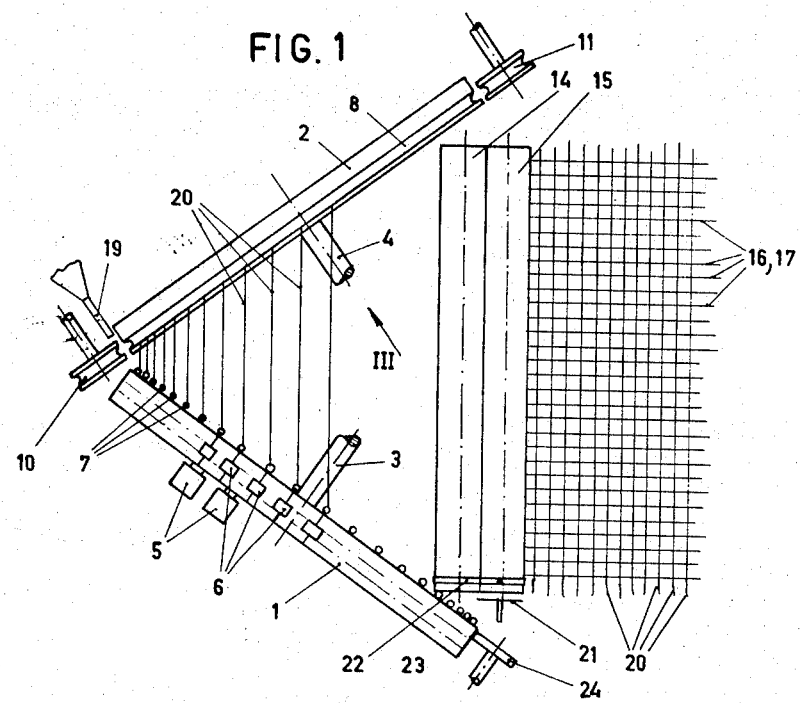
Figure 2:
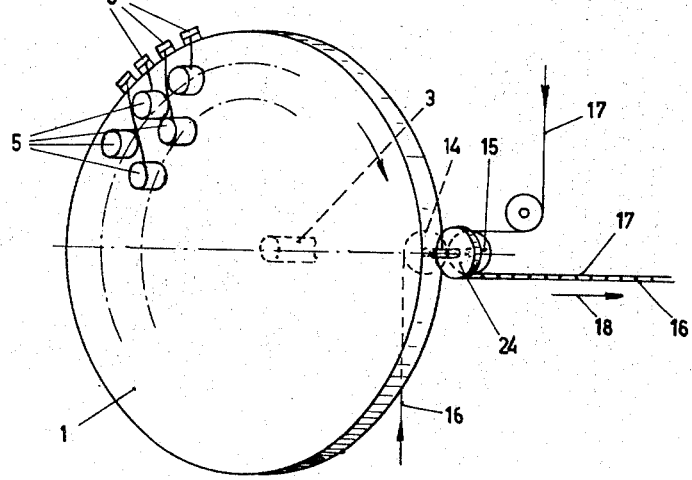
FIG. 2 is a view from one side of the device according to FIG. 1.
Figure 3:
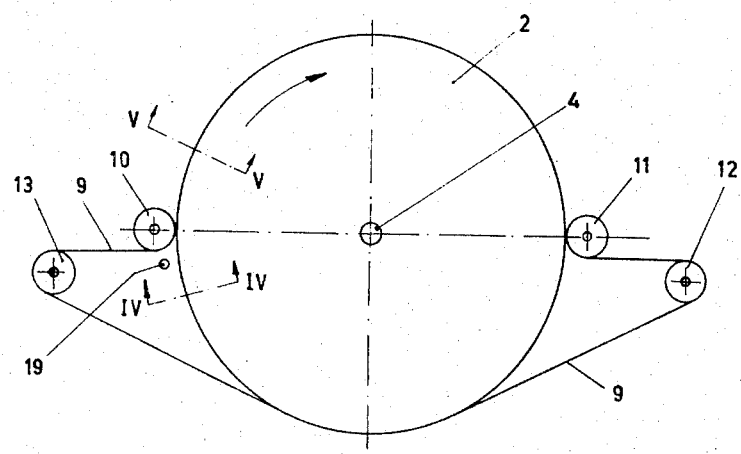
FIG. 3 is a view of a part of the device in the direction of arrow III.

Two wheels 1 and 2 are arranged in a vertical position at an angle with respect to each other and driven at an equal and constant speed through their shafts 3, 4 respectively, by means of a driving motor and reduction gear that are not shown.

Wheel 1 carries a great number of bobbins 5 on its side and on its periphery an equal number of yarn brakes 6 and eyelets 7. Through each brake 6 and eyelet 7, the thread from one of the bobbins 5 is fed.

Wheel 2 is provided with a peripheral V-shaped groove 8 in which an endless belt 9, having a corresponding V-shape, runs over approximately half the periphery of wheel 2. Belt 9 further runs on freely rotating rollers 10, 11, 12 and 13. Roller 10 presses belt 9 firmly into groove 8 at the location of the smallest distance between wheels 1 and 2 and is pulled out of groove 8 by roller 11 at the location of the largest distance between wheels 1 and 2.

At the latter location also the rollers 14 and 15 are arranged between wheels 1 and 2. Rollers 14 and 15 are driven by a motor and reduction gear that are not shown. A layer or warp of parallel threads 16 is supplied from below over roller 14 and a layer or warp of threads 17 is supplied from above over roller 15. Both layers of threads 16 and 17 join between rollers 14 and 15 and subsequently move away in the direction of arrow 18. A continuous foil, sheet or the like may be supplied together with one or each layer of threads.

At the same time transverse threads are supplied between both layers of threads 16 and 17 at the location where the latter join just over the pressing line of rollers 14 and 15. These transverse threads are prepared and delivered by wheels 1 and 2 and belt 9 as will now be described.

Figure 4:
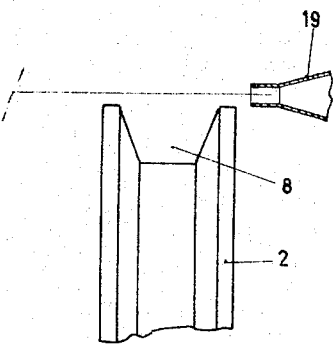
FIG. 4 is a view according to the line IV — IV in FIG. 3.
Figure 5:
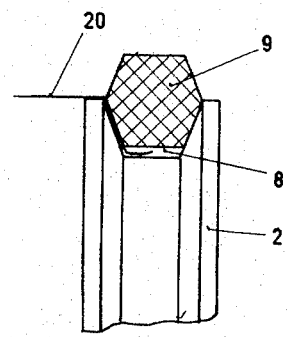
FIG. 5 is a view according to the line V — V in FIG. 3.

From each eyelet 7 at the bottom half of wheel 1, the end of the thread from the corresponding bobbin 5 hangs loosely down. The rotation of wheel 1 moves these thread ends towards the place where wheels 1 and 2 closely approach each other and where belt 9 runs into groove 8. A suction nozzle 19 is provided just ahead of this place with the result that each time a thread end passes nozzle 19, it is sucked across groove 8 (FIG. 4) and subsequently firmly clamped by belt 9, which is pressed into groove 8 by roller 10 (FIG. 5).

Through the continued rotation of wheels 1 and 2, the clamping place of the thread on wheel 2 and eyelet 7 on wheel 1 transversely move away from each other so that the thread is pulled off bobbin 5 to form a transverse thread 20. Brake 6 ensures that there is sufficient tension in thread 20 to keep it tight.

After about half a turn of wheels 1 and 2, thread 20 arrives at the location of the largest distance between wheels 1 and 2 and enters transversely between rollers 14 and 15 in between the layers of longitudinal threads 16 and 17 running on these rollers.

At the same moment thread 20 passes rotating knife 21 while being firmly clamped on one side of knife 21 between two rubber rings 22 and 23 located in grooves of rollers 14 and 15, respectively, and on the other side between the periphery of wheel 1 and freely rotating roller 24.

Also at the same moment the end of thread 20, which is clamped in groove 8 of wheel 2 is released, as belt 9 at the location runs out of groove 8 onto roller 11. As a result, thread 20 is free at both ends to move along between the layers of threads 16 and 17.

In the way described each rotation of wheels 1 and 2 produces as many transverse threads 20 as there are bobbins 5. A prototype of the device comprising 200 bobbins easily produces 2,000 transverse threads per minute at a rotational speed of the wheels of 10 rotations per minute, so that all motions are smooth rotations without inadmissable centrifugal forces of mass inertia or vibrations.

Large numbers of bobbins as in the prototype just mentioned are preferably arranged on a separate creel instead of wheel 1. The threads from the bobbins are collected to a bundle that is supplied to the centre of wheel 1 from where the threads are distributed to brakes 6 and eyelets 7 on the periphery. The creel is rotated at the same speed as wheel 1 to prevent the bundle of threads from being twisted. adjustable The positions of wheels 1 and 2 may be adjustale to adapt the length of threads 20 to the width of layers 16 and 17.

I claim:

1. A device for continuously laying a field of parallel threads transversely to one or more layers of longitudinal threads, foil, paper or the like for the production of textile-like and textile-reinforced materials, comprising two rollers between which said threads are laid, two synchronously rotatable diverging wheels, the intersecting axes of which are situated in a plane that is parallel to the axes of said rollers, the first of said wheels being provided with peripherally distributed means for the applying of threads across the two rotatable wheels, the second of said wheels having a peripheral circular groove, and an endless belt running in said groove over a part of the periphery of said second wheel, the cross-section of said belt being in accordance with the profile of said groove to perform a clamping action on threads that lie across said groove.

2. A device according to claim 1, wherein said rollers are situated between said two wheels substantially with their line of mutual contact at the location of the largest distance between the peripheries of said wheels, said wheels closely approaching each other at a diametrically opposite location and said endless belt running in the groove of said second wheel substantially from said location of the closest approach to said location of the largest distance between the peripheries of said wheels.

3. A device according to claim 2, wherein said means for applying threads across the two rotatable wheels comprises suction means positioned at the location of closest approach between the peripheries of said wheels for pulling thread from the periphery of said first wheel across to the periphery of said second wheel.

* * * * *